United States Patent [19]

Kozak et al.

[11] 3,934,786

[45] Jan. 27, 1976

[54] METHOD AND APPARATUS FOR SPLICING AND WELDING STRANDED ELECTRICAL CABLES

[75] Inventors: Stephen Kozak, Upper Saddle River, N.J.; Frederick J. Bender, Huntington; Jack Jerome, Glen Cove, both of N.Y.

[73] Assignee: Jerome Underground Transmission Equipment, Inc., Commack, N.Y.

[22] Filed: Nov. 20, 1974

[21] Appl. No.: 525,408

[52] U.S. Cl. ............................. 228/138; 228/44.1
[51] Int. Cl.² ..................................... B23K 31/00
[58] Field of Search ............... 29/470.7, 470.5, 628; 228/4, 44, 49, 135, 136, 137, 138, 4.1, 44.1

[56] References Cited
UNITED STATES PATENTS 3,667,119  6/1972  Cleaver et al. ........................ 29/628
3,688,397  9/1972  Cleaver et al. ........................ 29/628

Primary Examiner—Al Lawrence Smith
Assistant Examiner—Margaret Joyce
Attorney, Agent, or Firm—Bauer, Amer & King

[57] ABSTRACT

A method and apparatus for splicing and welding the ends of stranded electrical cables wherein a compression connector receives and is deformed about portions of the cable ends while a welding fixture is positioned thereabout. The welding fixture effects a reduced pressure along the cable periphery so that as molten material is deposited in the connector to join the cable ends, a portion of the molten material is caused to migrate inward along the cable interstices.

25 Claims, 16 Drawing Figures

METHOD AND APPARATUS FOR SPLICING AND WELDING STRANDED ELECTRICAL CABLES

This invention relates to a cable splicing appliance using a compression connector and mandrel wherein the welding occurs in an inert gas environment.

With present materials the transmission of electric power is more economical and efficient at high levels of voltages and currents. For example, it is common practice to transmit power at voltages of 138,000 volts and more. The conduction medium to which these power levels are applied is typically high voltage aluminum cable. Whereas copper is an excellent conductor of electricity and is relatively easy to work with and splice, it has significant drawbacks when applied to power transmission cable. Not the least of these drawbacks is the cost of copper. On the other hand aluminum cable has a number of advantages in power transmission. Aluminum has high electrical conductivity, it is lower in cost than copper and it is relatively light weight. Typically then, the aluminum cable itself will be a composite and may have many strands wrapped in layers or sections with the interstices between strands in layers comprising twenty percent of the total cable area. Further, it is advantageous to impregnate the cable interstices in a liquid or dielectric that is usually oil. Among other attributes, the impregnating oil acts as a dielectric reducing electric stress and it acts to shield the aluminum from contamination with its surroundings.

However, aluminum is inordinately difficult to weld and this is a severe disadvantage with its use. Not only is aluminum difficult to weld, but this problem is compounded by the fact that the cable is not a solid mass but, as noted, comprises a plurality of discrete strands that tend to separate making them difficult to evenly cut and then join. Because the cables are impregnated in oil, the oil must be removed before welding otherwise the presence of oil during welding will contaminate the weld. Further, it must be borne in mind that normally the splicing is done by workmen "in the field," all of which compounds these problems since an inert (gas) shield must envelop the molten metal to prevent oxidation and/or diffusion of hydrogen and nitrogen into the aluminum lattice sites. Conventionally then, it has been the practice to cut the cable, "bird cage" the segments and then wash the now separated strands in upwards of thirty gallons of solvent (Varsol III) and then repeat the process using about two gallons of 1, 1, 1, trichloroethane. The ends are then shaped and a "butter weld" is applied preparatory for the final jointing weld. Final welding is conducted in an inert gas environment where, depending on, inter alia, arc voltage, arc current and inert gas used, the temperatures can reach upwards of 6,000 to 10,000°F. Thus, care must be taken to monitor adjacent cable temperature and prevent it from rising much past 190°F. lest one burn the insulation.

The present invention is designed to simplify the procedure and apparatus used in splicing and jointing electric cables as disclosed in U.S. Pat. Nos. 3,688,397 and 3,667,119.

Generally, in the present invention a portion of the cable insulation is removed and the cable is cut exposing two ends. A clamp is placed over the cable periphery adjacent each end. A pin or mandrel having a region of reduced cross section is driven into each cable end along its central longitudinal axis until a pin end is flush with the plane of the cut. Another pin is likewise driven into the other cable end after which each clamp is loosened and slid along respective exposed cable portions for a short distance until contiguous to the insulation. The clamps, which may also be copper or stainless steel compression rings or collars, are then re-tightened. This isolates their respective end segment from its remaining cable.

Each cut end of the cable is inserted in a respective end of a compression connector or sleeve. The connector includes a receiving window to dimension the end segments in the connector with respect to each other and the connector itself. By an indexing compression technique, the connector is plastically deformed to a final diameter slightly smaller than the original cable diameter. This causes the cable segment between the compression connector and collars to "bird cage" or enlarge. A small quantity of solvent is poured into the viewing window.

A welding fixture operable to effect a reduced pressure is clamped onto the ends of the connector. The fixture has a central portion that maintains access to the central area of the connector or sleeve. The reduced pressure is coupled to the fixture which then, in combination with the cable interstices and reduced mandrel area, applies the negative pressure to the ends of the cable. The pressure gradient at the cable ends draw the solvent though the interstices of the cable or wire cleaning the oil therefrom. A bevel cut is then made in the central region of the connector nearly cutting through same to provide access to the cable strands for an efficient weld. Using the MIG (metal inert gas) welding technique a weld is deposited along and made to integrally connect the conductor ends. A pressure gradient is maintained across the weld front by application of the reduced pressure to the welding fixture. The pressure differential effects a migration of molten material into and towards the cable proper. Since the welding jig is a massive structure it acts as a heat sink during welding.

Means are provided to monitor cable temperature as well as to provide forced cooling. After the weld is made, the welding area is filed or machined to conform to the diameter of its adjacent connector. Preferably the weld area is then buffed or polished.

The recited procedure effects a clean and efficient weld. Electrical integrity between joined cable ends is maintained and the time consuming chore of "buttering" the strand ends is eliminated. The ten to 30 gallons of solvent of prior devices and procedure has been reduced to a few ounces.

It is therefore an object of the present invention to provide a method and apparatus for welding the ends of stranded electrical conductors.

It is a further object of the present invention to provide a method and apparatus for jointing the ends of stranded electrical cables that maintains electrical integrity between the joined cable portions.

It is a further object of the present invention to provide a method and apparatus that can be used to weld the ends of electrical cables yet obviates the step of buttering the cable ends preparatory to a final weld.

It is a still further object of the present invention to provide a method of welding the ends of stranded, oil impregnated electrical cables which it is able to do by using but a few ounces of solvent.

It is yet another object of the present invention to provide apparatus operable to draw a vacuum on the ends of oil impregnated electrical cables without drawing the oil impregnant from along the adjacent cable length.

Other objects and features of the present invention will become apparent from the following detailed description considered in connection with the accompanying drawings. It is to be understood, however, that the drawings are designed for illustration only and not as a definition of the limits of the invention for which reference should be made to the appended claims.

In the drawings wherein the same reference numeral denotes the same element throughout the several views.

Figure 9:
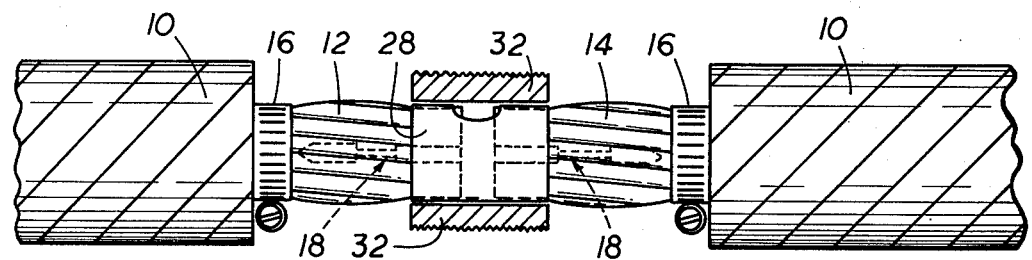
FIG. 9 shows a first application of a press to compress and plastically deform the compression connector.
Figure 11:
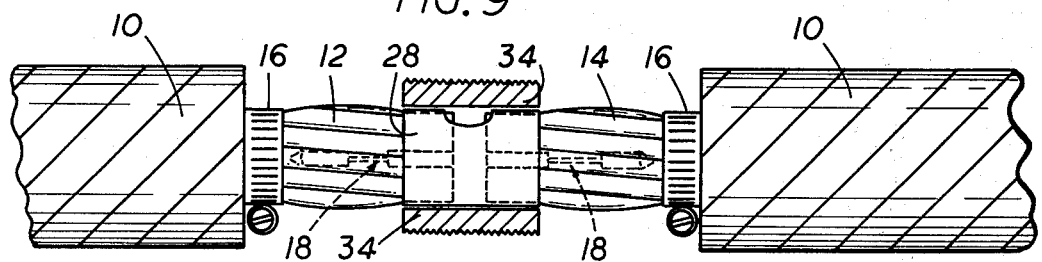
Figure 10:
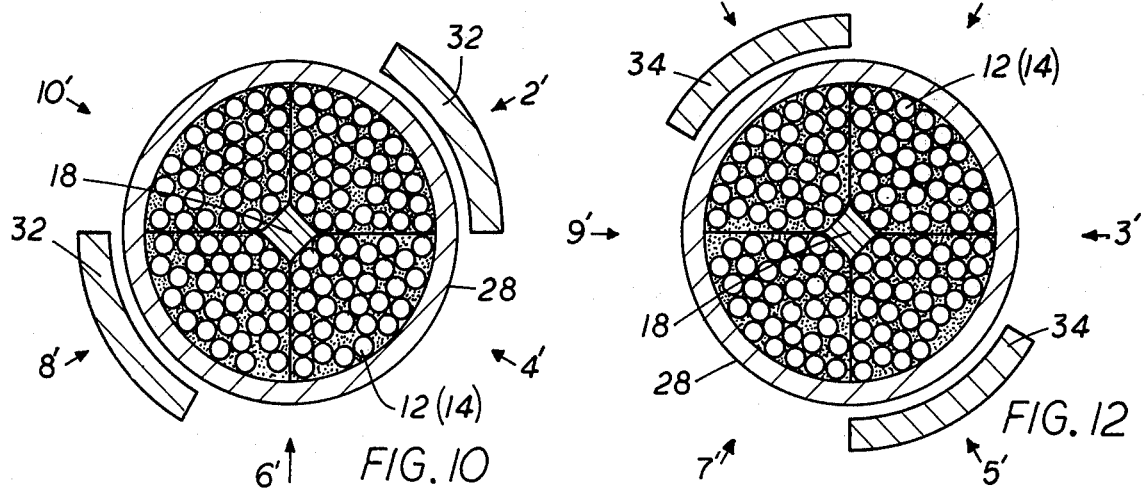
Figure 12:
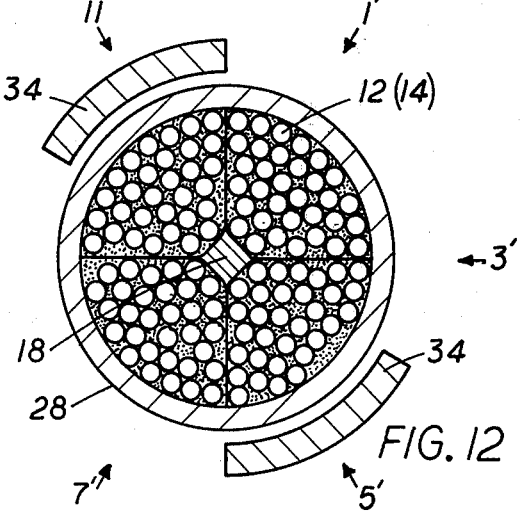
Figure 13:
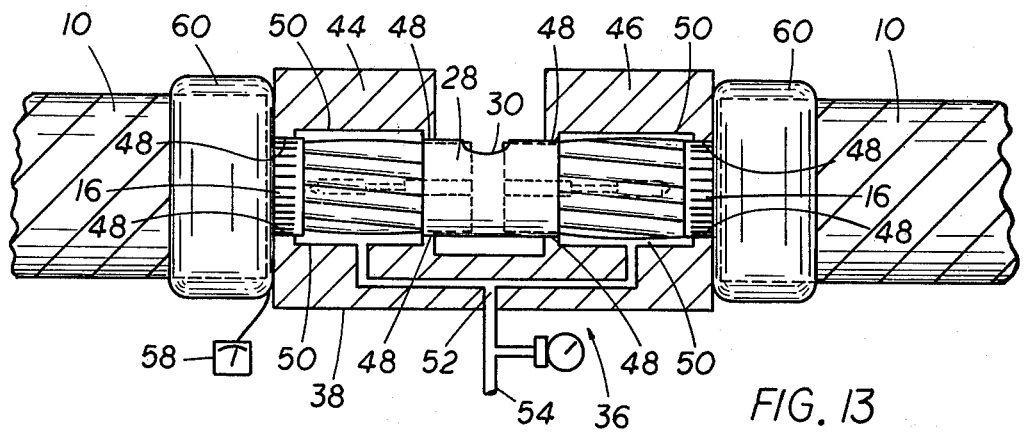
Figure 14:
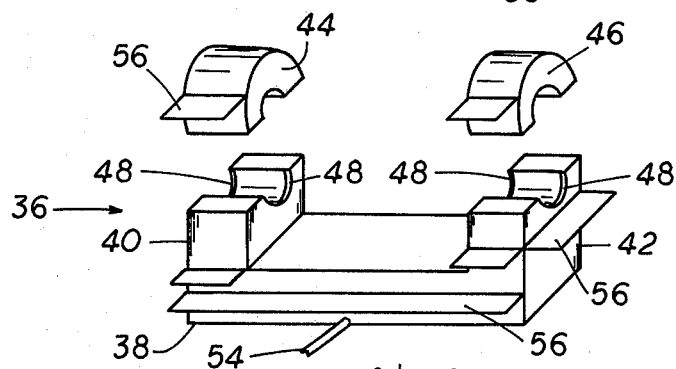
Figure 15:
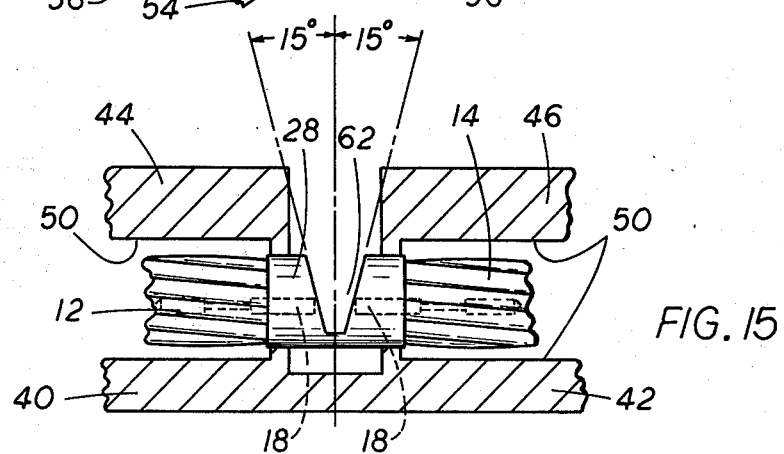
Figure 16:
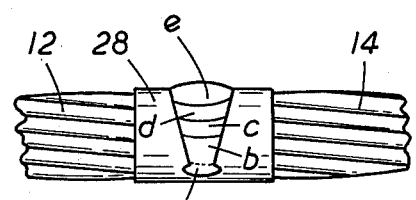

FIG. 10 reveals a first stage indexing sequence of the press of FIG. 9 about the connector periphery;

FIG. 11 shows a second application of the press shown in FIG. 9 and a view of the slightly enlarged configuration that the portion of cable between the connector collar assumes when the connector compresses the cable immediately therein;

FIG. 12 shows the indexing sequence of a second stage application of compression about the connector periphery by the means of FIG. 11;

FIG. 13 is a front view showing the construction of the welding fixture and how the same is coupled to the cable so that the reduced pressure is applied about respective enlarged or separated cable portions between a connector end and a respective collar;

FIG. 14 is an exploded perspective view of the welding fixture of the present invention;

FIG. 15 is a side view of the bevel cut applied to the compression connector to form a welding opening and in which the weld is deposited; and FIG. 16 is an enlarged side view of the weld deposited in the welding window and showing how the weld is formed.

Figure 1:
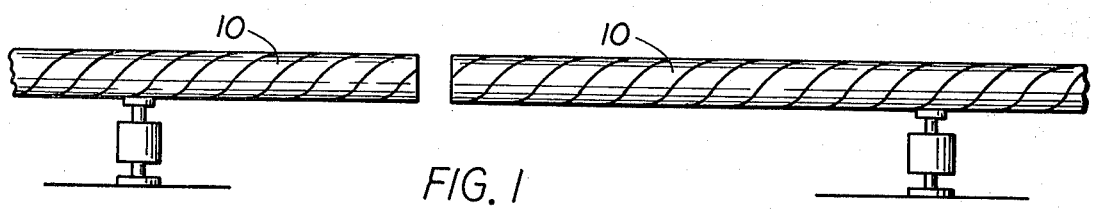
FIG. 1 is a side view of the cable ends to be spliced according to the teaching of the invention.
Figure 2:
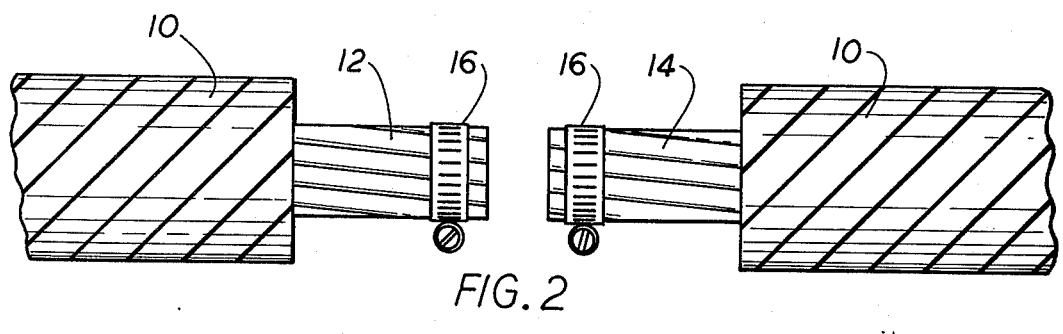
FIG. 2 is an enlarged view of the end regions of the cables of FIG. 1 after a portion of the insulation has been stripped to expose the stranded conductors and showing the compression means in a first position along the cable ends.

Referring now to the drawings, and particularly FIGS. 1-12, there is shown the inventive apparatus used to prepare the cable ends prior to welding. The cable ends that are to be joined are placed in opposed axially aligned yet spaced relation. Cable insulation 10 is removed from the cable end region of each conductor to reveal stranded conductor end segments 12 and 14 (FIG. 2). Compression means 16 which might typically be a hose clamp or deformable collar is positioned on each cable segment 12 and 14 at its approximate end. If means 16 is a collar then its inside diameter will be complimentary with the outside diameter of its respective cable segment. The material from which compression means 16 is chosen is one that when plastically deformed, as described below, will retain its deformed shape without creeping back or returning to its original configuration.

Figure 3:
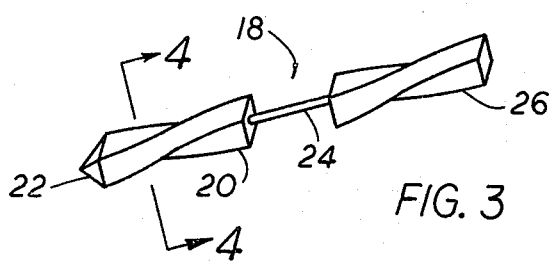
FIG. 3 is a perspective view of the insertion pin or mandrel according to the present invention.
Figure 4:
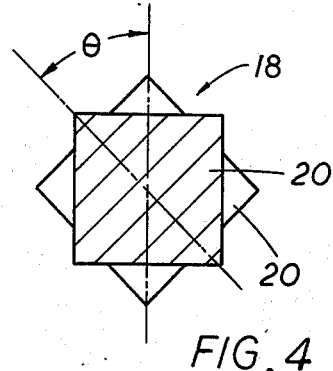
FIG. 4 is an enlarged view of the mandrel along the line 4—4 of FIG. 3 and looking in the direction of the arrows.
Figure 5:
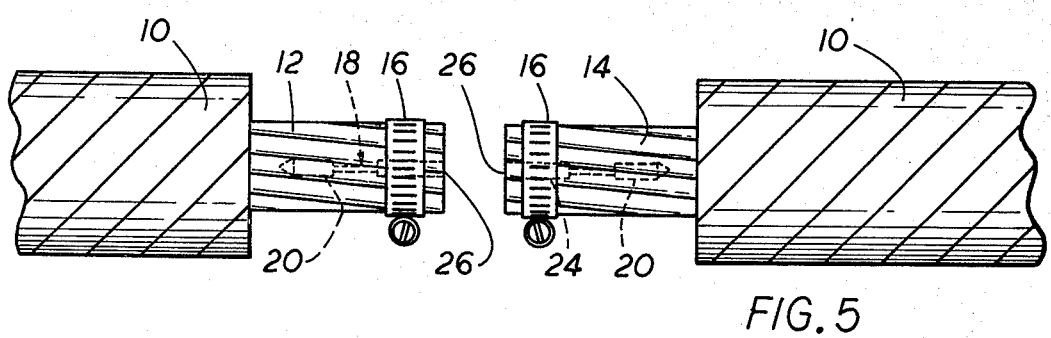
FIG. 5 shows the mandrel of FIGS. 3 and 4 being driven into a respective end of the cable with the cable in the approximate position of FIG. 2.

A mandrel or insertion pin is seen in FIGS. 3 and 4 and is generally indicated by reference numeral 18. Preferably mandrel 18 comprises a first portion 20 that has a tapered leading tip 22. Connected to first portion 20 along the central longitudinal axis thereof and oppositely directed from tip 22 is a region of reduced cross section 24. And, coupled to region 24 likewise along the central longitudinal axis thereof is a second portion 26. Referring now to FIG. 4 it will be seen that each of first and second portions of mandrel 18 has an essentially square cross section. However, it will be noticed that the corresponding sides of mandrel portions 20 and 26 pitch or twist at an angle Theta ($\theta$) corresponding to the convolution winding of the cable strands. Angle Theta, the pitch angle, while obviously fixed for a given mandrel, will be chosen to accord with the convolution angle or pitch of the strands.

In the example shown, since two ends are to be joined, two mandrels 18 are supplied. Each mandrel is driven into a respective cable end segment along the central longitudinal axis thereof until flush with a corresponding segment end or face. The compression means 16 holds the cable strands together about the mandrel and prevents the cable ends from bird caging, separating or enlarging.

Figure 6:
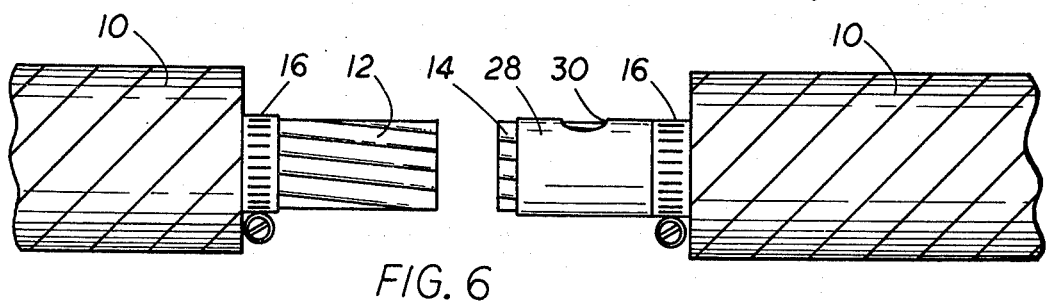
FIG. 6 shows the compression means at its second position near the cable insulation where it will act to isolate the remaining cable from the end regions thereof, and shows the compression connector sleeve placed on one cable end preparatory to its final positioning.

After each mandrel is driven into its associated cable end, the hose clamp or collar 16 is loosened and then slid along the length of its respective cable segment until at the position of FIG. 6 where it is spaced from a respective segment end.

Figure 7:
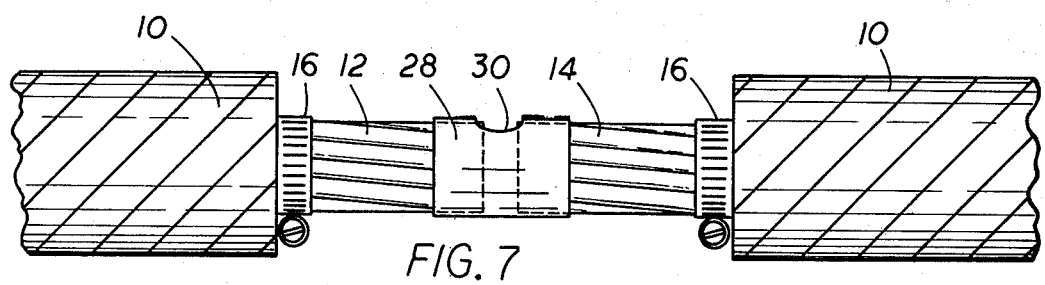
FIG. 7 shows the compression connector concomitantly engaging both cable ends and aligned thereon.
Figure 8:
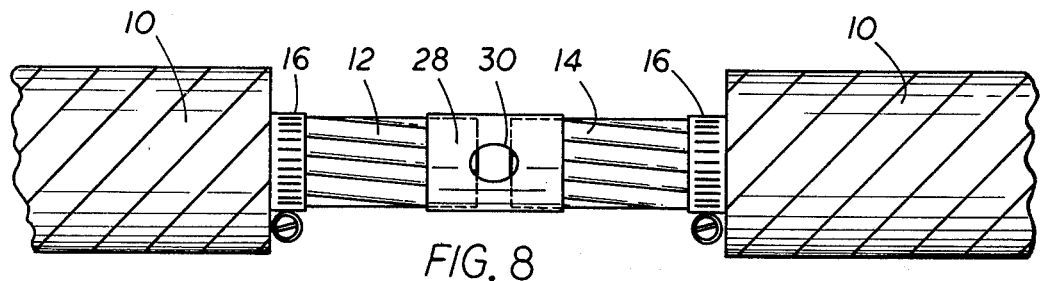
FIG. 8 is a top view of the apparatus of FIG. 7 clearly showing the welding window or alignment aperture.

A compression connector sleeve 28 is defined by two opposed open ends and a sight window 30. Window 30 is formed through the sleeve wall at a position approximately equidistant between the open ends. With compression means 16 at the position of FIG. 6, sleeve 28 is placed onto one cable segment, that in the example shown is segment 14. The other cable segment, that in this case is segment 12, is aligned so that sleeve 28 can then slide, leftward when viewing the last mentioned figure, onto segment portion 12 so that the sleeve concomitantly engages both cable segments in a respective end thereof. Window 30 is used to view the position of the ends of cable segments 12 and 14 in sleeve 30 so that as seen in FIGS. 7 and 8, an annular space exists therebetween while the segments are approximately equidistant into and from their respective sleeve ends.

Compression means 16 is then caused to compact the cable strands immediately therewithin. For example, if means 16 is a hose or worm clamp, as above noted, it is tightened, or means 16 is a deformable collar, it is compressed and plastically deformed to a reduced diameter. In either case, compression means in its tightened or deformed configuration acts to compact the cable strands and thereby nearly eliminate cable interstices in the compression region thereof. In so doing, means 16 acts to isolate or block oil flow from the interstices of the remaining cable to a respective segment 12 or 14 when a reduced pressure is applied to the segment as described below.

Connector 28 is then plastically deformed to a reduced diameter by a two stage compression process. FIGS. 9 and 10 schematically indicate the first stage of compression and the means and sequence for effecting same. A die 32 and an associated press therefor, the press not shown, is adapted to effect a first and intermediate reduction of the connector diameter. This is accomplished by sequentially rotating jaws 32 in an arc and clockwise direction at the indexing stations indicated at 2'–4'–6'–8'–10'–12' about the connector periphery. Application of a compressive load at the above cited indexing stations compresses connector sleeve 28 to a reduced diameter having a relatively smooth and uninterrupted periphery devoid of ridges and protrusions thereon.

Turning to FIGS. 11 and 12 there is indicated the second stage compression where a die 34 of smaller configuration than die 32 effects a second and final reduction in connector diameter albeit in a counter clockwise direction. Die 34 is caused to compress and plastically deform connector 28 according to the counter clockwise indexing sequence 11'–9'–7'–5'–3'–1' about the connector periphery. In the deformation sequences for stations of FIGS. 10 and 12, the indexing compressions continue until the dies can fully close without connector distortion. It is to be understood that the final diameter to which compression connector 28 is compressed may be identical to the diameter or size of compression means or collar 16. This will facilitate manufacture and use of a welding fixture that is described below. By way of example, and not limitation, connector 28 might have an outside diameter of 2.25 in. after first stage compression and plastic deformation its outside diameter is reduced to 2.06 in. After second stage compression the connector's outside diameter has been reduced to 1.930 in. This last mentioned outside diameter of connector 28 accords with and may equal the outside diameter of collar 16. Upon completion of the compression sequences, the die and press are removed from the working area.

The connector and adjacent cable strands are cleaned of oil and other contaminants by spraying with an ounce or two of Freon TF. Further, approximately one ounce of Freon TF is poured into view hole 30 to fill the annular space between the compressed and opposed ends of the cable. By dwelling in the annular space between cable ends, the Freon TF permeates through the interstices of the cable strands during or after which a vacuum welding fixture is attached to the connector and cable as will now be described.

Turning to FIGS. 13 and 14 there is shown in the former figure attachment of the fixture to the cable, and in the latter figure the construction of the fixture itself. The welding fixture, generally indicated by reference numeral 36, includes a main frame 38 formed integrally with two spaced cable supports 40 and 42. The spacing between the two supports is such so that when connector 28 is positioned therebetween, the peripheral end regions of connector 28 will concomitantly engage an associated support. The length of each support along the longitudinal axis of the cable is sufficient so as to extend between each connector end region and a peripheral portion of a corresponding and opposed compression collar 16. Detachable caps 44 and 46 are complimentary with the length of respective supports 40 and 42. And, means common in the art, and therefore not shown, demountably fasten a cap to its associated seat. Each cap and support combination 40 and 44, and 42 and 46 include seats 48 complimentary with the corresponding compressed peripheral portion of connector 28 and collar 16, as the case may be and as seen in FIG. 13. A semi-annular vacuum chamber 50 is defined in each of supports 40 and 42 and each of caps 44 and 46 between their respective seats 48. A manifold 52 communicates with each chamber 50 in each support. And, a negative pressure line 54 extending from frame 38 is coupled to manifold 52. Preferably frame 38 will include a plurality of cooling fins 56 to transfer heat to the surrounding environment.

To insure an effective seal around seats 48 it will be advantageous to wrap the corresponding engaging peripheries of connector 28 and collar 16 with a heat resistant tape typically of TEFLON. Connector 28 is then positioned between supports 40 and 42. This places collars 16 along with associated portions of segments 12 and 14 in respective supports 40 and 42. The caps are then clamped onto their corresponding supports causing seats 48 to lock against and seal respective taped peripheral regions of the connector and collars. Semi-annular chambers 50 of each cap and support combination merge to form an air-tight annular vacuum chamber about each exposed cable periphery extending between each end of connector 28 and its associated collar 16. A thermocouple or temperature indicating device 58 is coupled to the cable near insulation covering 10. A tape poultice or boot seal 60 extending from each collar 16 to its adjacent cable insulation 10 effects an air-tight enclosure therebetween as seen in FIG. 13.

Not only does fixture 36 couple a vacuum to and act as a heat sink for the cable, as will be described later, but the fixture acts to mechanically support the connector while same is cut which will be described now.

Turning to FIG. 15 there is shown a bevel cut or welding opening 62 made in the connector 28 equidistant from the ends thereof and defining welding window 30. Opening 62 provides access to the strand ends of each cable segment 12 and 14 as well as providing an approach angle for an inert gas and electric welding gun, not shown. While the angle of cut is not critical, it should be at about a fifteen degree angle with respect to a plane perpendicular to the longitudinal axis of connector 28, as shown in the last mentioned figure.

After cutting opening 62 a negative or reduced pressure is coupled to line 54. Line 54 communicates the negative pressure or vacuum to manifold 52 that in turn distributes the negative pressure to each of the annular vacuum chambers formed by the respective cap and support combinations. This negative pressure is then applied about the cable periphery between each connector end and collars 16. The area of reduced cross section 24 of mandrel 18 is positioned in the slightly enlarged areas of the cable ends 12 and 14 formed between respective collars 16 and connector 28. Further, the mandrel reduced cross section is also in the area of the annular vacuum chamber formed by joining respective cap and support members that overlie the enlarged or slightly bird caged strands of end segments 12 and 14. This construction insures that the negative or reduced pressure existing in the annular chambers is communicated to the exposed ends of the cable strands defining opening 62. The pressure gradient coupled to and existing at the strand ends forming opening 62 causes a suction inwardly therefrom and substantially along the cable axis. A small amount of Freon TF is sprayed into opening 62 to effect a further cleansing and washing of oil from the strand ends. With the reduced pressure still maintained in each annular chamber, the welding begins. The welding is done with an electric arc and is performed in an inert gas environment as is commonly practiced. The welding gun, which is not shown, usually contains nozzle means for producing the inert gas envelope. In FIG. 16 a preferred welding sequence is shown consisting of five welding "passes." As the welding progresses the molten material is deposited in layers $a$, $b$, $c$, $d$ and $e$ in opening 62 thereby connecting the cable ends. It will be readily apparent that fixture 36 being a good conductor and having a large mass will act as a heat sink during the welding process. That is, during welding the fixture acts to inhibit temperature rise in the cable near insulation 10. Yet, temperature sensing means 58 continually monitors cable temperature near insulation 10 and if the cable temperature begins to rise past 190°F., air can be forced over fins 58 to cool the fixture and lower segment temperature.

During the welding operation the molten material deposited in opening 62 will experience a driving force caused by the aforesaid pressure gradient at the strand ends. The gradient effects a migration of the molten material sucking it inwardly substantially axially inward from the ends of and along the respective segment axis of each cable. This migration adds to the mechanical strength of the weld by joining and welding together lengthwise portions of the strands of each cable as well as welding the facing cables by the weld material in the interstices of the cable strands. After the weld cools, the fixture and Teflon taping is removed and the weld is ground down to conform to the periphery of connector 28. The resulting welded area comprises a solid structure of enhanced electrical conductivity. The collars or compression means 16 remain on their respective cable segments and operate to prevent excessive separation of the cable strands.

While only a single embodiment of the present invention has been shown and described, it will be apparent that many changes and modifications can be made hereto without departing from the spirit and scope thereof. It is the intention, therefore, to be limited only as indicated by the scope of the claims appended hereto.

What is claimed is:

1. In an apparatus for splicing and welding together the adjacent ends of stranded electrical cables,
a sleeve compressibly engaging the adjacent cable ends in alignment with each other and having a welding window defined therein,
deformable clamp means to compressibly and clampingly engage with each cable to effect a compaction of and eliminate interstices between the strands of the cable thereat and block the flow of fluid therebeyond and spaced from said sleeve to form on its respective cable an area of enlargement between said clamp means and said sleeve means,
and a welding fixture connected about the cables adjacent said ends thereof and including means to effect a negative pressure at said enlarged area of each cable such that molten welding material deposited in said window experiences a migration substantially along the cable axis toward said enlarged area as the weld fills the window and connects said cable ends.

2. An apparatus as in claim 1,
a mandrel for insertion into each cable end and having an area of reduced cross-section in said enlarged cable area.

3. An apparatus as in claim 1,
means sealing said welding fixture air-tightly to the respective cable.

4. An apparatus as in claim 1,
said sleeve being of a metallic material as copper, aluminum or stainless steel that when deformed retains its deformed configuration.

5. In an inert gas, electric arc welding kit to weld together the adjacent ends of stranded cable,
a compression collar adapted to slide onto the cable periphery and compress the strands of the cable to eliminate spaces between the same to block the flow of fluid therebeyond,
a mandrel having a peripheral portion of reduced cross-section and operable to be driven into a respective cable end,
a compression connector having two open ends into which fit respective ends of the cables and a welding window therebetween whereby when said compression collar and connector are deformed plastically to a reduced size, the interstices of the cables extending therebetween in combination with said mandrel reduced cross-section presents a path through which fluid can flow,
and a welding fixture including means to effect a reduced pressure at said cable paths so that when said welding fixture is coupled to the cables said paths couple the reduced pressure to the respective cable ends to apply the reduced pressure thereat.

6. In the kit of claim 5, said welding fixture comprising convective cooling means across which a cooling fluid is adapted to pass.

7. In the kit of claim 6, said convective cooling means being a plurality of radiating fins to transfer the heat from same to the ambient environment.

8. In the kit of claim 5, means to concomitantly seal said fixture to peripheral portions of said compression collar and connector.

9. In the kit of claim 8, said means for concomitant sealment further comprises TEFLON boots to effect a fluid-tight envelope about said compression collar and connector.

10. In an apparatus for welding together the ends of electrical cables,
means to compressibly retain the cable ends in welding spaced alignment,
clamp means to clamp each cable at a portion of the length thereof remote from said retainer means to so compress the strands of each cable as to eliminate the flow of fluid therebeyond and to form with said retainer means an area extending therebetween in which the cable strands are uncompressed,
and means on said cable ends applying a negative pressure to said cable areas to create a vacuum thereat and at the spaced ends of the electrical cables to draw into the cables from their ends fluids and molten material toward said cable areas and between the strands thereof.

11. In an apparatus as in claim 10, means in each cable end to provide a path for the flow of fluids and molten material from said cable ends toward said cable areas.

12. In a method of welding the ends of stranded electrical cables, securing the cable ends in relatively spaced relationship and from relative movement, connecting each of the cable ends together in their spaced relation by a connector and compressing the same about the cable ends, constricting the cable strands at a portion of the length of each cable remote from the respective connected ends thereof to block the flow of fluid therebeyond, applying a negative pressure along a portion of the cables between their respective constricted portions and the connected cable ends, while depositing welding material at the spaced ends of the cables.

13. In a method as in claim 12, and driving a pin into the compressed end of each cable while providing a path in each cable in the portion thereof of the applied negative pressure.

14. In a method as in claim 13, introducing a cleaning solvent between the spaced cable ends during the application of the negative pressure and before depositing the welding material.

15. In a method of welding the ends of stranded electrical cables, spacing the cable ends from each other, applying a negative pressure along a portion of each cable to weld the spaced cable ends while depositing molten welding material thereat, and constricting the strands of each of the cables at a portion remote from the cable ends to direct the negative pressure to be applied to the cable ends to cause the negative pressure to draw the molten welding material inward from the cable ends along and between the strands.

16. A method for welding the ends of stranded electrical cable including the steps of:

clamping the periphery of each cable near the end thereof;

driving a mandrel having an area of reduced cross-section into each clamped cable end;

releasing the clamp from said clamping step and repositioning it on the cable periphery spaced from a respective end thereof;

fitting each cable end into a respective end of a compression connector;

reclamping the clamp and isolating the respective cable end from the remaining cable;

compressing the compression connector and locking the cable ends therein;

attaching a welding fixture about the compression connector with the welding fixture coupling a reduced pressure to the cable;

cutting a welding opening in the compression connector for exposing the respective cable ends; and welding the exposed ends of the cable by depositing molten material in the welding opening.

17. The method of claim 16 wherein said step of fitting each cable end is accomplished by providing a viewing window in the compression connector for aligning the respective cable ends therein.

18. The method of claim 17 wherein said step of compressing the compression connector by plastically deforming the compression connector to a diameter smaller than the adjacent and uncompressed cable.

19. The method of claim 18 wherein said step of plastic deformation occurs in an indexing sequence about the periphery of the compression connector.

20. The method of claim 19 wherein said step of reclamping the clamp is accomplished by plastically deforming the clamp.

21. The method of claim 17 further including the step of pouring a solvent into the viewing window for cleaning the respective cable ends so the solvent is drawn through the end regions of the cable by operation of the reduced pressure.

22. The method of claim 16 further including the step of monitoring the cable temperature.

23. The method of claim 16, performing the step of welding in an inert gas environment and using an electric arc.

24. The method of claim 23 wherein said welding step is accomplished by providing a continuous envelope of gaseous helium.

25. The method of claim 16, and removing an excess weld material from the region of the welding opening conforming same to the outer periphery of the adjacent compression connector.

* * * * *